(12) United States Patent
Tran (10) Patent No.: US 7,827,491 B2
(45) Date of Patent: Nov. 2, 2010

(54) SYSTEMS AND METHODS FOR VIDEO EDITING

(76) Inventor: Bao Q. Tran, 6768 Meadow Vista Ct., San Jose, CA (US) 95135

(*) Notice: Subject to any disclaimer, the term of this patent is extended or adjusted under 35 U.S.C. 154(b) by 302 days.

(21) Appl. No.: 11/433,897

(22) Filed: May 12, 2006

(65) Prior Publication Data

US 2007/0262995 A1    Nov. 15, 2007

(51) Int. Cl.
*G06F 3/00*    (2006.01)
(52) U.S. Cl. ...................................................... 715/719
(58) Field of Classification Search .................. 715/719
See application file for complete search history.

(56) References Cited

U.S. PATENT DOCUMENTS

| | | | |
|---|---|---|---|
| 5,867,229 A * | 2/1999 | Stevens | 348/722 |
| 6,178,317 B1 | 1/2001 | Kroeger et al. | |
| 6,542,205 B2 | 4/2003 | Ohtani et al. | |
| 6,545,670 B1 | 4/2003 | Pryor | |
| 6,564,053 B1 | 5/2003 | Briskman et al. | |
| 6,597,375 B1 | 7/2003 | Yawitz | |
| 6,623,127 B2 | 9/2003 | Bhat | |
| 6,624,936 B2 | 9/2003 | Kotchick et al. | |
| 6,725,354 B1 | 4/2004 | Kahle et al. | |
| 6,750,883 B1 | 6/2004 | Parupudi et al. | |
| 6,760,005 B2 | 7/2004 | Koyama et al. | |
| 6,766,036 B1 | 7/2004 | Pryor | |
| 6,833,811 B2 | 12/2004 | Zeitfuss et al. | |
| 6,871,982 B2 | 3/2005 | Holman et al. | |
| 6,891,979 B2 | 5/2005 | Hu et al. | |
| 6,900,941 B2 | 5/2005 | Kaminsky et al. | |
| 6,913,362 B2 | 7/2005 | Ito et al. | |
| 6,919,892 B1 | 7/2005 | Cheiky et al. | |
| 6,940,482 B2 | 9/2005 | Ishii et al. | |
| 7,119,843 B2 * | 10/2006 | Terasaki et al. | 348/373 |
| 2003/0092470 A1 | 5/2003 | Kurakane | |

OTHER PUBLICATIONS

Russell Chun, "Flash 5 for Windows and Machintosh: Visual QuickPro Guide," Dec. 29, 2000, Peachpit Press.*
Oystein Hoie, "Intel to follow AMD's 64-bit route?", Jan. 28, 2000, InfoSatellite.com.*
Jacob Rosenberg, "Adobe Premiere Pro 1.5 Studio Techniques," Jun. 28, 2004, Adobe Press.*
Adobe Creative Team, "Adobe Premiere 5.0 Classroom in a Book," Jun. 26, 1998, Adobe Press.*
Symbio, "2004 Integrated Toshiba televisions, now ready for Symbio," 2004, Toshiba.*
Nathan Brookwood, "Inte'l Fall Developer Forum (IDF): Megahertz is Dead, Long Live Dual-Core," Sep. 15, 2004, Insight 64.*
DataPilot, "Cables," www.susteen.com/cables.htm, Feb. 24, 2003.*

(Continued)

*Primary Examiner*—William L Bashore
*Assistant Examiner*—Daniel Um
(74) *Attorney, Agent, or Firm*—Tran & Associates (57) ABSTRACT

Systems and methods are disclosed to edit video by receiving a source video; processing the source video with a plurality of tasks including one or more transitions, effects, and audio; assigning the tasks to a plurality of general purpose processor cores and a graphics processing unit (GPU); and rendering a video output.

15 Claims, 4 Drawing Sheets

OTHER PUBLICATIONS

Memento LE, "Record your Yahoo! Messenger Webcam session video," www.net-sharing.com/Memento-LE.htm, Feb. 2006.*
Skype, "Free Internet telephony that just works," www.skype.com, Jan. 2005.*
JVC, "Digital Video Camera GR-DX300 GR-DX95 GR-DX75," 2003.*
Brookwood, "Intel's Fall Developer Forum (IDF): Megahertz is Dead, Long Live Dual-Core," Sep. 2004.*
Oystein Hoie, "Intel to follow AMD's 64-bit route?", Jan. 2002.*
Mark Foster and Hugh LaMaster, "NREN Conversion to a Point-toPoint Full Mesh Core for Multicasting Services," Jan. 1999.*
JVC, "JVC HDV Camcorder GY-HD100 Technical Report," Mar. 2006.*
Jacob Rosenberg, "Adobe Premiere Pro 1.5 Studio Techniques," Jun. 2004.*
Review-Shop.com, "Review and Pictures of Sony DCR-DVD201 Handycam DVD Camcorder," May 2005.*
ETI Camcorder Pro, "ETI Camcorder 2," Oct. 2005.*
Adobe Premiere web page at http://adobe.com/products/premiere/overview2.html.

* cited by examiner

FIG. 4 capture a video using a camera positioned on the same board with a processor and an optional GPU (400)

display frames of the video for editing (402)

select one or more frames to be cut (404)

select one or more transitions to be applied to the video (406)

select one or more audio tracks to add to the video (408)

adjust the volume of the video (410)

render the edited video for viewing (412)

FIG. 5

SYSTEMS AND METHODS FOR VIDEO EDITING

BACKGROUND

The present invention relates to a video editing system.

As computers decrease in price and increase in processing power, software-based computer-implemented video editing systems are being purchased by more consumers. Such computer-implemented video editing systems manipulate video data in a digital format, such as the Motion Pictures Expert Group (MPEG) compression format MPEG-2.

A conventional user interface for controlling a video editing system permits a user to select a clip of the video segment being edited. The selected video clip may then be copied or cut and pasted into another video segment. A conventional user interface can include a timeline bar with a fixed length, and two markers or other indicia in the timeline bar to represent the beginning and end of the selected clip. In order to select the video clip from the source video, the user may need to play the source video, stop the video at the frame where the user wishes to start the clip, mark the starting frame, resume playing the video, stop the video again where the user wishes to end the clip, and mark the ending frame. Some users can find these conventional interfaces confusing, unintuitive, inefficient, time-consuming or difficult to master.

U.S. Pat. No. 6,597,375 discloses a user interface for selection of a video clip in a video editing system that includes a first control element, a first video window, a second control element, and a second video window. The first control element is positioned to select a starting frame of a video clip from a video data source. The first video window is operatively coupled to the first control element to display the starting frame of the video clip. The second control element is positioned to select an ending frame of the video clip. The second video window is operatively coupled to the second control element to display the ending frame of the video clip simultaneously with the display of the starting frame in the first video window. The first video window updates dynamically as the first control element is moved, and the second video window updates dynamically as the second control element is moved.

U.S. Pat. No. 6,725,354 discloses a microprocessor having a first processor core and a second processor core. The first core includes a first processing block. The first processing block includes an execution unit suitable for executing a first type of instruction. The second core includes a second processing block. The second processing block includes an execution unit suitable for executing an instruction if the instruction is of the first type. The processor further includes a shared execution unit. The first and second processor cores are adapted to forward an instruction to the shared execution unit for execution if the instruction is of a second type. In one embodiment, the first type of instruction includes fixed point instructions, load/store instructions, and branch instructions and the second type of instruction includes floating point instructions.

SUMMARY

In one aspect, a process to edit video includes: receiving a source video; generating a plurality of tasks including one or more transitions, one or more effects, and one or more audio edit to be applied to the source video; assigning the tasks to a plurality of general purpose processor cores and a graphics processing unit (GPU); and receiving the outputs from the cores and the GPU; and rendering a video clip as an output.

Implementations of the above aspect may include one or more of the following. The processor can be 64-bit processor. The GPU comprises a graphics card. The system can distribute tasks among the plurality of general purpose processors and the GPU to accelerate the preview and rendering of motion, opacity, color, and image distortion effects. The video can be scaled to one of: DV, Digital Betacam, HDV, HDCAM, DVCPRO HD, and D5 HD. The system can capture and edit HDV or HDTV content. The system can play-back video in real-time. Multiple video channels can be played at full resolution and with titles, transitions, effects, and color correction. HDTV or HDV can be played in real time. Multiple video tracks from a multicam shoot can be viewed and the system can switch between tracks in real time. The system can perform color correction in real time. The system can apply primary and secondary color-correction tools to match shots; change colors; correct exposure errors; and modify highlights, midtones, and shadows across a clip, a sequence, or a project. The editing can include switching multiple nestable timelines. The system can generate 5.1 surround sound. The system can create and manipulate multichannel audio to produce surround sound. The system can generate interactive DVDs for digital dailies, test discs, or final delivery. The system can render transitions and effects using a first general purpose processor; render audio using a second general purpose processor; and render the video clip output using the GPU.

In another aspect, a system includes a plurality of general purpose processor cores; a graphics processing unit (GPU) coupled to the plurality of general purpose processor cores; and code executable by the processor cores and the GPU to receive a source video; process the source video with the plurality of general purpose processors and the GPU; and render a video output.

In implementations of the above aspect, the tasks are distributed among the plurality of general purpose processors and the GPU to accelerate the preview and rendering of motion, opacity, color, and image distortion effects. An HDV or HDTV camera can be connected to the processor cores.

In another aspect, a computer readable disk includes code for receiving and editing HDV or HDTV content; specifying tasks to be applied to the content including transitions, effects, and audio; assigning the tasks to a plurality of general purpose processor cores and a graphics processing unit (GPU) to accelerate the preview and rendering of title, transition, motion, opacity, color, and image distortion effects; and rendering a video output.

In another aspect, a telephone includes a camera and a processor coupled to the camera, the processor having code to capture a video using the camera; display frames of the video for editing; select one or more frames to be cut; select one or more transitions to be applied to the video; select one or more audio tracks to add to the video; and adjust the volume of the video. The telephone may be a cell phone, a WiFi phone, a WiMAX phone, or an FCC part-15 compatible phone such as a corded or cordless telephone.

In another aspect, a camcorder includes a camera and a processor coupled to the camera, the processor having code to capture a video using the camera; display frames of the video for editing; select one or more frames to be cut; select one or more transitions to be applied to the video; select one or more audio tracks to add to the video; and adjust the volume of the video.

In another aspect, a camera includes a processor having code to capture a video using the camera; display frames of the video for editing; select one or more frames to be cut;

select one or more transitions to be applied to the video; select one or more audio tracks to add to the video; and adjust the volume of the video.

In another aspect, the invention is directed to a computer program product tangibly stored on a computer-readable medium to perform the methods of the invention.

Advantages of the invention may include the following. The video editing system can be implemented on a multi-core desktop computer or workstation. Alternatively, the system can be implemented on mobile devices such as cell phones, video camcorders, cameras, and video cameras, among others. The system provides major improvements in terms of video capabilities of mobile networks. The system supports high performance mobile communications and computing and offers consumers and enterprises mobile computing and communications anytime, anywhere and enables new revenue generating/productivity enhancement opportunities. Further, in addition to enabling access to data anytime and anywhere, the equipment is easier and cheaper to deploy than wired systems. Besides improving the overall capacity, the system's broadband wireless features create new demand and usage patterns, which will in turn, drive the development and continuous evolution of services and infrastructure.

DESCRIPTION

Figure 1:
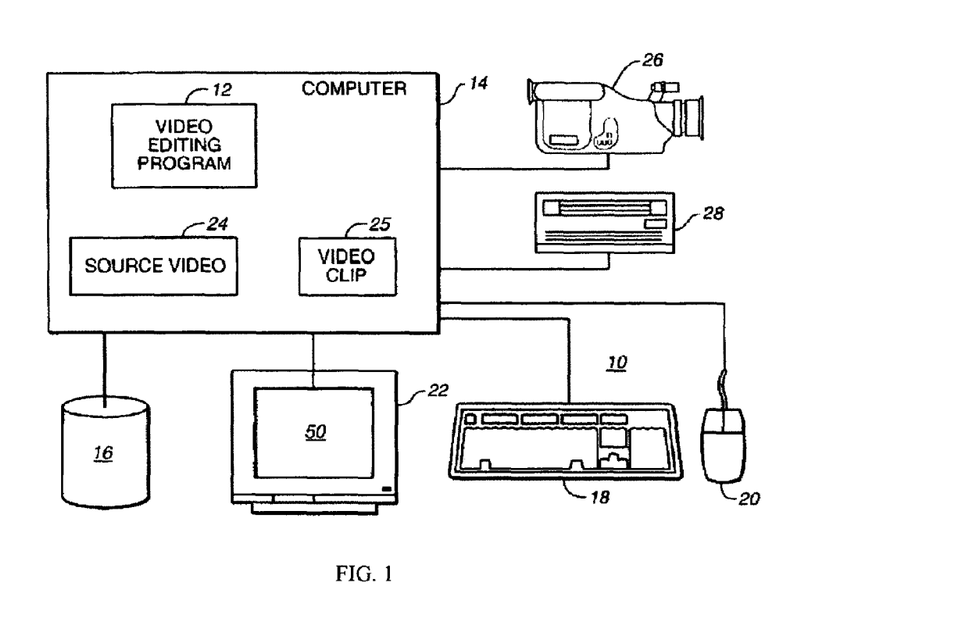
FIG. 1 is a schematic diagram of a computer system with a video editing system in accordance with the present invention.

As shown in FIG. 1, a computer-implemented video editing system 10 includes a general purpose programmable digital computer 14 (such as a personal computer or workstation), a mass storage device 16 (such as a magnetic, optical or magneto-optical disk or tape drive), a keyboard 18, a pointer device 20 (such as a mouse), and a display 22 having screen 50. The computer 14 is of conventional construction, and includes a processor capable of executing computer program instructions, and memory for storing programs and data. The computer 14 executes a video editing program 12, and stores one or more source video files 24 and one or more video clips 25 in the memory, on the mass storage device, or on another storage peripheral. In this specification, the term "video" also covers audiovisual data.

The video editing system 10 can be connected to one or more video signal sources 26. The sources can be digital, such as digital camcorder, or analog, such as broadcast television. If the source of the video signal uses an analog format, the video editing system 10 can convert the analog video signal into a digital video signal. This can be done in a variety of ways, such as with a video interface card or as computer software running on the computer 14. Furthermore, the video editing system 10 can be connected to one or more output devices 28 that store or transmit analog or digital video data. The video editing system 10 can also include communications hardware and software by which the computer 14 is connected to other computer systems with an intranet or Internet link to send or receive streaming video data. Although illustrated as an individual computer, the video editing system 10 can be implemented on a computer network, and the data and programs used in the video editing system 10 can be stored and run on separate computers.

Figure 2:
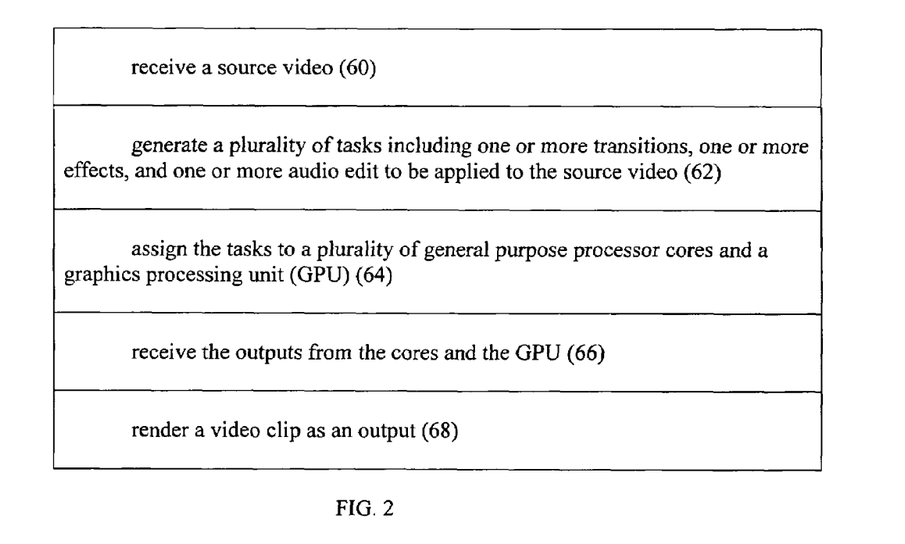
FIG. 2 shows an exemplary process supported by the video editing system of FIG. 1.

FIG. 2 shows one embodiment for high performance video editing. In this embodiment, the process receives a source video (60); generates a plurality of tasks including one or more transitions, one or more effects, and one or more audio edit to be applied to the source video (62); assigns the tasks to a plurality of general purpose processor cores and a graphics processing unit (GPU) (64); receives the outputs from the cores and the GPU (66); and renders a video clip as an output (68).

During the making of a video, the user can build a Storyboard, and the system divides the video into segments to make it easier to drag and drop the parts the user wants onto the storyboard where the video or movie can be edited. Once the user decides which ones he/she wants to put in the video, the user can click and drag the clips to the Storyboard in the order in which they should appear in the video or movie. Next, the user can edit clips. In one embodiment, in a timeline view, the user can click on a particular clip to be trimmed. In a Preview window, the user can drag the scroll bar slowly and watch as the video progresses. At the point where the clip is to be trimmed, the user can set a Start Trim Point (indicating the first frame to be cut), and the user can drag the progress indicator until it reaches the desired end point of your clip and the user can then click a Set End Trim Point (indicating the last frame to be cut) and the system deletes the video segment defined by the Start and End Trim Points.

Additionally, clips can be made. A clip is a smaller segment of a larger video file. A video clip can be split into a plurality of clips. This is useful if the user wants to insert either a picture or a video transition in the middle of a clip. The user can split a clip that appears on the storyboard/timeline of a current project, or you can split the clip in the Contents pane. The user can combine two or more contiguous video clips. Contiguous means the clips were captured consecutively so that the end of one clip is immediately followed by the beginning of the next. Combining clips is useful if the user has several short clips and wants to view them as one clip on the storyboard/timeline. The user can hide unwanted parts of the clip. Trimming does not remove the information from the source material and the user can restore the clip to its original length at any time. Clips can only be trimmed after they have been added to the storyboard/timeline.

Typically, abrupt transitions occur at the deleted video segment, so one or more transitions can be added to improve the changing of one clip to another in the video. The user can add a transition effect between each movie and picture. Transitions are visual tools that bridge the gap between one scene and another. The user can select transitions such as Bars, Checkerboard, Dissolve, Eye, Keyhole, Circle, among others. Adding a video transition is as easy as adding a picture. Simply drag the transition to the small square in-between each clip. The user can also add a video effect, which visually distorts the video or picture. For example, the user can age the movie or add color distortions. Video effects add video movement to animate a still image. Effects can be added to any clip by draggin the effect onto any given clip in the storyboard.

A soundtrack can really draw the audience in and add fun to the video or movie. The user can import favorite music clips and then drag them to the timeline. The user can adjust the volume of the music being added in relationship to and the volume of the audio on the video clip. For example, the user can turn the audio track on the video clip all the way down so that only the music is heard, or adjust the levels so that both are audible. A slider can be dragged left or right, depending on whether the user wants the audio from the video to be more prominent or the music to be more prominent.

Figure 3:
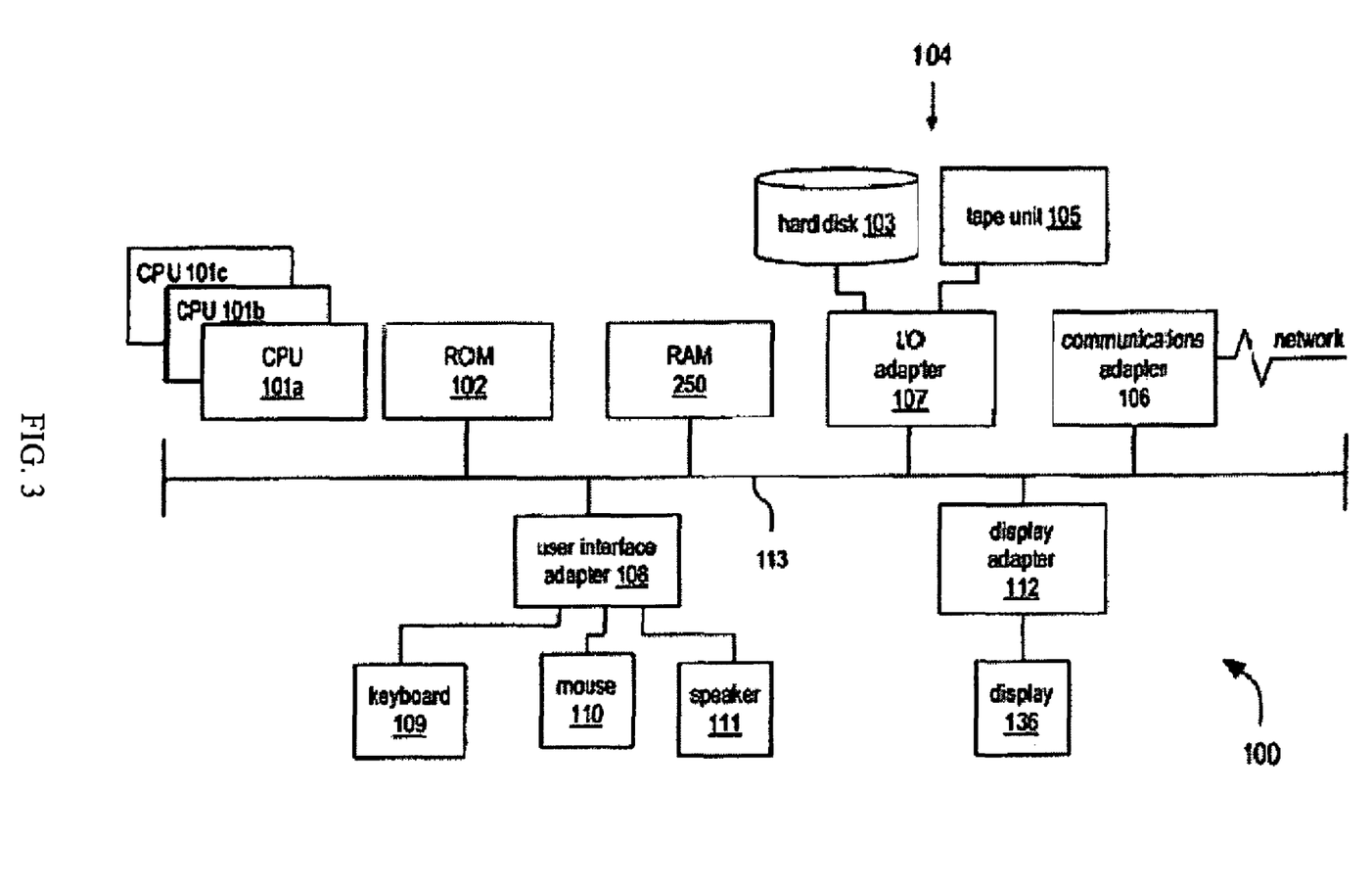
FIG. 3 is a block diagram of a data processing system including a shared resource processor according to one embodiment.

FIG. 3 shows an embodiment of a data processing system 100. System 100 has one or more central processing units (processors) 101a, 101b, 101c, etc. (collectively or generically referred to as multi-core processor(s) 101. In one embodiment, each processor 101 may be a reduced instruction set computer (RISC) microprocessor or a CISC processor as commercially available from Intel or AMD. Processor cores 101 are coupled to system memory 250 and various other components via system bus 113. Read only memory (ROM) 102 is coupled to the system bus 113 and may include a basic input/output system (BIOS), which controls certain basic functions of system 100. An I/O adapter 107 and a network adapter 106 are coupled to the system bus 113. I/0 adapter 107 may be a small computer system interface (SCSI) adapter that communicates with a hard disk 103 and/or tape storage drive 105. I/O adapter 107, hard disk 103, and tape storage device 105 are collectively referred to herein as mass storage 104. A network adapter 106 interconnects bus 113 with an outside network enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O busses for connecting peripheral devices such as hard disk controllers, network adapters, and graphics adapters include AGP or PCI graphic cards. Additional input/output devices are shown as connected to system bus 113 via user interface adapter 108 and display adapter 112. A keyboard 109, mouse 110, and speaker 111 all interconnected to bus 113 via user interface adapter 108, which may include, for example, a SuperI/O chip integrating multiple device adapters into a single integrated circuit. As configured in FIG. 1, system 100 includes multi-core processing means in the form of processor cores 101, storage means including system memory 250 and mass storage 104, input means such as keyboard 109 and mouse 110, and output means including speaker 111 and display 136. In one embodiment a portion of system memory 250 and mass storage 104 collectively store an operating system such as Windows, Apple, Linux, or AIX operating system to coordinate the functions of the various components shown in FIG. 3.

In one embodiment, AMD's dual core 64-bit processor with AMD's Direct Connect technology places two 64-bit processors on a single die, that is, twice the processing power sharing the same physical footprint of a single CPU. The instructions sets delivered to the CPU via the software can be spread over two CPUs. AMD's Direct Connect architecture directly connects the CPU to the I/O, memory controllers and other CPUs, eliminating the bottlenecks and reducing latency. The integrated DDR memory controller within this architecture reduces latencies during memory access when compared to traditional front-side bus based memory controllers. The HyperTransport technology offers a high speed point-to-point that connects directly to the CPUs and the I/Os. With Direct Connect architecture, the CPUs have their own dedicated memory controller, which does away with the bottleneck and optimizes the performance of system memory at the same time.

Figure 4:
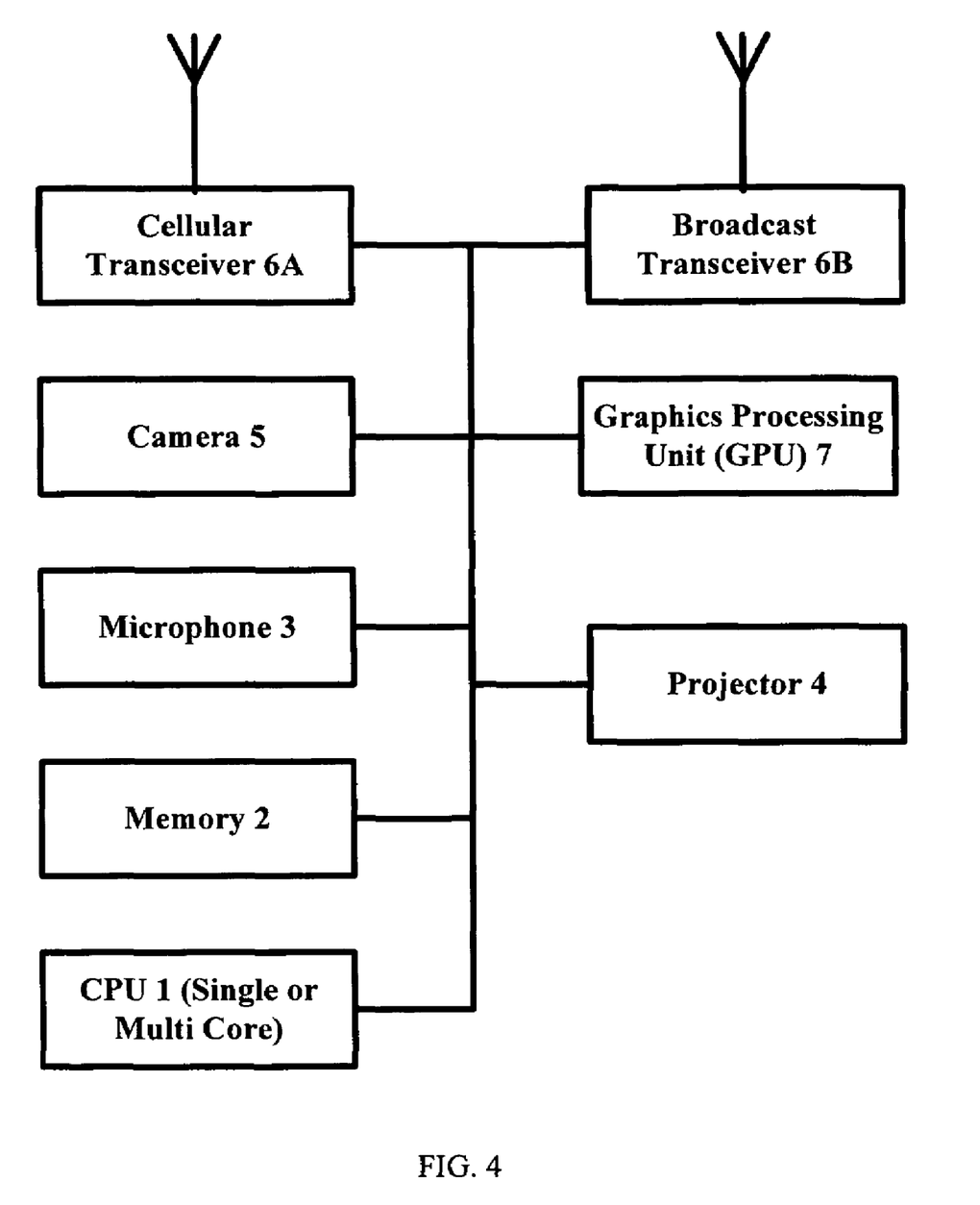
FIG. 4 shows an exemplary mobile system that provides video editing.

FIG. 4 shows an exemplary portable data-processing device (such as a mobile phone, a camcorder, or a camera) having enhanced I/O peripherals and video editing capability. In one embodiment, the device has a processor 1 (which can have one core or can have a plurality of cores therein) connected to a memory array 2 that can also serve as a solid state disk. The processor 1 is also connected to a light projector 4, a microphone 3 and a camera 5.

An optional graphics processing unit (GPU) 7 is connected to the processor 1. For example, the GPU 7 may be NVIDIA's GoForce 5500 which focuses mainly on video decoding/encoding and 3D acceleration. The GPU 7 can playback H.264, WMV9 and MPEG4 (DivX/Xvid) in real time at native DVD resolutions and can also handle up to a 10-megapixel image size.

A cellular transceiver 6A is connected to the processor 1 to access cellular network including data and voice. The cellular transceiver 6A can communicate with CDMA, GPRS, EDGE or 4G cellular networks. In addition, a broadcast transceiver 6B allows the device to receive satellite transmissions or terrestrial broadcast transmissions. The transceiver 6B supports voice or video transmissions as well as Internet access. Other alternative wireless transceiver can be used. For example, the wireless transceiver can be WiFi, WiMax, 802.X, Bluetooth, infra-red, cellular transceiver all, one or more, or any combination thereof.

In one implementation, the transceiver 6B can receive XM Radio signals or Sirius signals. XM Radio broadcasts digital channels of music, news, sports and children's programming direct to cars and homes via satellite and a repeater network, which supplements the satellite signal to ensure seamless transmission. The channels originate from XM's broadcast center and uplink to satellites or high altitude planes or balloons acting as satellites. These satellites transmit the signal across the entire continental United States. Each satellite provides 18 kw of total power making them the two most powerful commercial satellites, providing coast-to-coast coverage. Sirius is similar with 3 satellites to transmit digital radio signals. Sirius's satellite audio broadcasting systems include orbital constellations for providing high elevation angle coverage of audio broadcast signals from the constellation's satellites to fixed and mobile receivers within service areas located at geographical latitudes well removed from the equator.

In one implementation, the transceiver 6B receives Internet protocol packets over the digital radio transmission and the processor enables the user to browse the Internet at high speed. The user, through the device, makes a request for Internet access and the request is sent to a satellite. The satellite sends signals to a network operations center (NOC) who retrieves the requested information and then sends the retrieved information to the device using the satellite.

In another implementation, the transceiver 6B can receive terrestrial Digital Audio Broadcasting (DAB) signal that offers high quality of broadcasting over conventional AM and FM analog signals. In-Band-On-Channel (IBOC) DAB is a digital broadcasting scheme in which analog AM or FM signals are simulcast along with the DAB signal The digital audio signal is generally compressed such that a minimum data rate is required to convey the audio information with sufficiently high fidelity. In addition to radio broadcasts, the terrestrial systems can also support internet access. In one implementation, the transceiver 6B can receive signals that are compatible with the Ibiquity protocol.

In yet another embodiment, the transceiver 6B can receive Digital Video Broadcast (DVB) which is a standard based upon MPEG-2 video and audio. DVB covers how MPEG-2 signals are transmitted via satellite, cable and terrestrial broadcast channels along with how such items as system information and the program guide are transmitted. In addition to DVB-S, the satellite format of DVB, the transceiver can also work with DVB-T which is DVB/MPEG-2 over terrestrial transmitters and DVB-H which uses a terrestrial broadcast network and an IP back channel. DVB-H operates at the UHF band and uses time slicing to reduce power consumption. The system can also work with Digital Multimedia Broadcast (DMB) as well as terrestrial DMB.

In yet another implementation, Digital Video Recorder (DVR) software can store video content for subsequent review. The DVR puts TV on the user's schedule so the user can watch the content at any time. The DVR provides the power to pause video and do own instant replays. The user can fast forward or rewind recorded programs.

In another embodiment, the device allows the user to view IPTV over the air. Wireless IPTV (Internet Protocol Television) allows a digital television service to be delivered to subscribing consumers using the Internet Protocol over a wireless broadband connection. Advantages of IPTV include two-way capability lacked by traditional TV distribution technologies, as well as point-to-point distribution allowing each viewer to view individual broadcasts. This enables stream control (pause, wind/rewind etc.) and a free selection of programming much like its narrowband cousin, the web. The wireless service is often provided in conjunction with Video on Demand and may also include Internet services such as Web access and VOIP telephony, and data access (Broadband Wireless Triple Play). A set-top box application software running on the processor 210 and through cellular or wireless broadband internet access, can receive IPTV video streamed to the handheld device.

IPTV covers both live TV (multicasting) as well as stored video (Video on Demand VOD). Video content can be MPEG protocol. In one embodiment, MPEG2TS is delivered via IP Multicast. In another IPTV embodiment, the underlying protocols used for IPTV are IGMP version 2 for channel change signaling for live TV and RTSP for Video on Demand. In yet another embodiment, video is streamed using the H.264 protocol in lieu of the MPEG-2 protocol. H.264, or MPEG-4 Part 10, is a digital video codec standard, which is noted for achieving very high data compression. It was written by the ITU-T Video Coding Experts Group (VCEG) together with the ISO/IEC Moving Picture Experts Group (MPEG) as the product of a collective partnership effort known as the Joint Video Team (JVT). The ITU-T H.264 standard and the ISO/IEC MPEG-4 Part 10 standard (formally, ISO/IEC 14496-10) are technically identical, and the technology is also known as AVC, for Advanced Video Coding. H.264 is a name related to the ITU-T line of H.26x video standards, while AVC relates to the ISO/IEC MPEG side of the partnership project that completed the work on the standard, after earlier development done in the ITU-T as a project called H.26L. It is usual to call the standard as H.264/AVC (or AVC/H.264 or H.264/MPEG-4 AVC or MPEG-4/H.264 AVC) to emphasize the common heritage. H.264/AVC/MPEG-4 Part10 contains features that allow it to compress video much more effectively than older standards and to provide more flexibility for application to a wide variety of network environments. H.264 can often perform radically better than MPEG-2 video-typically obtaining the same quality at half of the bit rate or less. Similar to MPEG-2, H.264/AVC requires encoding and decoding technology to prepare the video signal for transmission and then on the screen 230 or substitute screens (STB and TV/monitor, or PC). H.264/AVC can use transport technologies compatible with MPEG-2, simplifying an up-grade from MPEG-2 to H.264/AVC, while enabling transport over TCP/IP and wireless. H.264/AVC does not require the expensive, often proprietary encoding and decoding hardware that MPEG-2 depends on, making it faster and easier to deploy H.264/AVC solutions using standards-based processing systems, servers, and STBs. This also allows service providers to deliver content to devices for which MPEG-2 cannot be used, such as PDA and digital cell phones.

The H.264/AVC encoder system in the main office turns the raw video signals received from content providers into H.264/AVC video streams. The streams can be captured and stored on a video server at the headend, or sent to a video server at a regional or central office (CO), for video-on-demand services. The video data can also be sent as live programming over the network. Standard networking and switching equipment routes the video stream, encapsulating the stream in standard network transport protocols, such as ATM. A special part of H.264/AVC, called the Network Abstraction Layer (NAL), enables encapsulation of the stream for transmission over a TCP/IP network. When the video data reaches the handheld device through the transceiver 6B, the application software decodes the data using a plug-in for the client's video player (Real Player and Windows Media Player, among others).

In addition to the operating system and user selected applications, another application, a VOIP phone application executes on the processing unit or processor 1. Phone calls from the Internet directed toward the mobile device are detected by the mobile radio device and sent, in the form of an incoming call notification, to the phone device (executing on the processing unit 1). The phone device processes the incoming call notification by notifying the user by an audio output such as ringing. The user can answer the incoming call by tapping on a phone icon, or pressing a hard button designated or preprogrammed for answering a call. Outgoing calls are placed by a user by entering digits of the number to be dialed and pressing a call icon, for example. The dialed digits are sent to the mobile radio device along with instructions needed to configure the mobile radio device for an outgoing call using either the cellular transceiver 6A or the wireless broadcast transceiver 6B. If the call is occurring while the user is running another application such as video viewing, the other application is suspended until the call is completed. Alternatively, the user can view the video in mute mode while answering or making the phone call.

The light projector 4 includes a light source such as a white light emitting diode (LED) or a semiconductor laser device or an incandescent lamp emitting a beam of light through a focusing lens to be projected onto a viewing screen. The beam of light can reflect or go through an image forming device such as a liquid crystal display (LCD) so that the light source beams light through the LCD to be projected onto a viewing screen.

Alternatively, the light projector 4 can be a MEMS device. In one implementation, the MEMS device can be a digital micro-mirror device (DMD) available from Texas Instruments, Inc., among others. The DMD includes a large number of micro-mirrors arranged in a matrix on a silicon substrate, each micro-mirror being substantially of square having a side of about 16 microns.

Another MEMS device is the grating light valve (GLV). The GLV device consists of tiny reflective ribbons mounted over a silicon chip. The ribbons are suspended over the chip with a small air gap in between. When voltage is applied below a ribbon, the ribbon moves toward the chip by a fraction of the wavelength of the illuminating light and the deformed ribbons form a diffraction grating, and the various orders of light can be combined to form the pixel of an image. The GLV pixels are arranged in a vertical line that can be 1,080 pixels long, for example. Light from three lasers, one red, one green and one blue, shines on the GLV and is rapidly scanned across the display screen at a number of frames per second to form the image.

In one implementation, the light projector 4 and the camera 5 face opposite surfaces so that the camera 5 faces the user to capture user finger strokes during typing while the projector 4 projects a user interface responsive to the entry of data. In another implementation, the light projector 4 and the camera 5 on positioned on the same surface. In yet another implementation, the light projector 4 can provide light as a flash for the camera 5 in low light situations.

Figure 5:
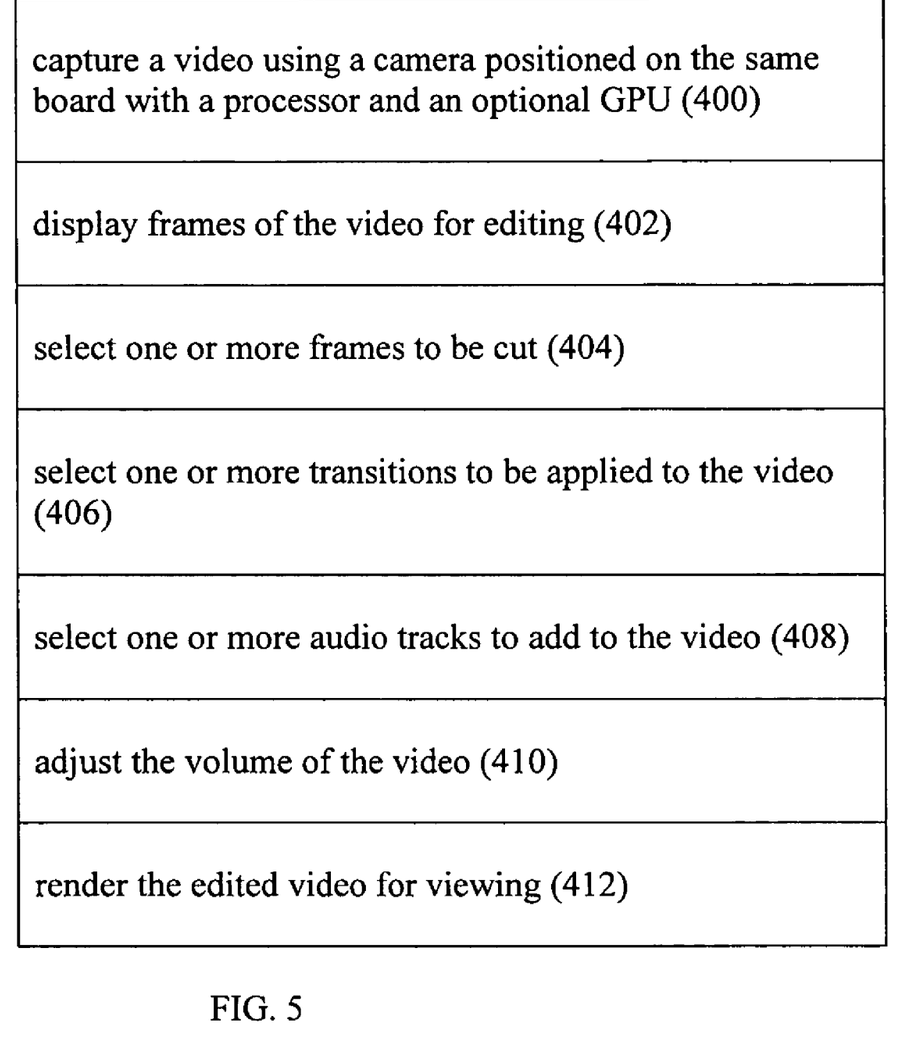
FIG. 5 shows an exemplary process to edit video on a mobile device.

As shown in FIG. 5, an exemplary process to edit video on a mobile device captures a video using a camera positioned on the same board with a processor and an optional GPU (400) and displays frames of the video for editing (402). The process selects one or more frames to be cut (404) and selects one or more transitions to be applied to the video (406). The process can also select one or more audio to add to the video (408) and adjust the volume of the video (410). The process then renders the edited video for viewing (412). The process of FIG. 5 automatically detects the presence of the optional GPU 7 (FIG. 4) as well as multi-core engines in the processor 1 (FIG. 4) and takes advantage of the added hardware capabilities in editing and rendering video.

In another embodiment, as part of the content upload, the user captures and edits video taken with a mobile devic such as a camcorder, a camera, a mobile phone, or a cell phone. The user performs simple edits to the video segment. The system allows the editing user more creative freedom at each step in the process, such as being able to preview and correct each edit decision on the fly. The video editing process becomes similar to putting together a document or graphics presentation where the user cuts and pastes the segments together adding effects and titles.

The software can provide Linear Editing where the content can only be edited sequentially similar to older mechanical techniques of cutting films to perform the edit functions. The software can alternatively provide Non-Linear Editing where editing in this environment is essentially is a visual Cut-and-Paste method and the user can edit any part of the video at will.

The system can provide In-Camera Editing: Video shots are structured in such a way that they are shot in order and of correct length. In another embodiment, the system allows the user to assemble edit: Video shots are not structured in a specific order during shooting but are rearranged and unneeded shots deleted at the time of transferring (copying). This process requires at the least, a Camcorder and VCR. the original footage remains intact, but the rearranged footage is transferred to a new tape. Each scene or cut is "assembled" on a blank tape either one-at-a-time or in a sequence. The system can provide two types of Assemble Editing: 1) A Roll--Editing from a single source, with the option of adding an effect, such as titles or transitioning from a frozen image the start of the next cut or scene and 2) A/B Roll—Editing from a minimum of two sources or Camcorders and recording to a third source. The system can also support insert editing where new material is recorded over existing footage. This technique can be used during the original shooting process or during a later editing process. The system provides Titles on Cardboard, Paper, or other Opaque Media—Painting titles on opaque media and recording the pages on videotape and inserting or assembling the title between scenes, previously shot, during the editing process.

The system supports audio or sound mixing where two or more sound sources can be connected to a sound mixer and then inputted into the video. The system also supports Audio Dubbing for adding audio to footage that is already edited together or previously shot. The audio is added to the video tape without altering the previously recorded video and, in some cases, without altering the previously recorded audio.

The above process is suitable for editing consumer produced content which tends to be short. In certain contents such as news or movies that take too long to transmit or view, the contents need to be reduced into chunks of one, five, ten or fifteen minutes, for example, to allow easy viewing while the user is traveling or otherwise don't have full attention on the device for an extended period. In one embodiment, video is micro-chunked to reduce entertainment to its simplest discrete form, be it a blog post, a music track, or a skit. Next, the system makes the content available and lets people download, view, read, or listen. The system lets consumers subscribe to content through RSS- and podcast-style feeds so they can enjoy it wherever and whenever they like. Optionally, the system can put ads and tracking systems into the digital content itself to provide revenue. In one implementation, the system provides microchunk videos entirely free, but it plays in a pop-up window alongside an ad or alternatively short commercials also play before some segments. The microchunks can be e-mailed, linked to, searched for, downloaded, remixed, and made available on-line.

The user or producer can embed meta data into the video or music. Exemplary meta data for video or musical content such as CDs includes artist information such as the name and a list of albums available by that artist. Another meta data is album information for the title, creator and Track List. Track metadata describes one audio track and each track can have a title, track number, creator, and track ID. Other exemplary meta data includes the duration of a track in milliseconds. The meta data can describe the type of a release with possible values of: TypeAlbum, TypeSingle, TypeEP, TypeCompilation, TypeSoundtrack, TypeSpokenword, TypeInterview, TypeAudiobook, TypeLive, TypeRemix, TypeOther. The meta data can contain release status information with possible values of: StatusOfficial, StatusPromotion, StatusBootleg. Other meta data can be included as well.

The meta-data can be entered by the videographer, the producer, the record company, or by a viewer or purchaser of the content. In one implementation, a content buyer (such as a video buyer of video content) can store his or her purchased or otherwise authorized content on the server in the buyer's own private directory that no one else can access. When uploading the multimedia files to the server, the buyer annotates the name of the files and other relevant information into a database on the server. Only the buyer can subsequently download or retrieve files he or she uploaded and thus content piracy is minimized. The meta data associated with the content is stored on the server and is searchable and accessible to all members of the community, thus facilitating searching of multimedia files for everyone.

In one implementation that enables every content buyer to upload his/her content into a private secured directory that cannot be shared with anyone else, the system prevents unauthorized distribution of content. In one implementation for music sharing that allows one user to access music stored by another user, the system pays royalty on behalf of its users and supports the webcasting of music according to the Digital Millennium Copyright Act, 17 U.S.C. 114. The system obtains a statutory license for the non-interactive streaming of sound recordings from Sound Exchange, the organization designated by the U.S. Copyright Office to collect and distribute statutory royalties to sound recording copyright owners and featured and non featured artists. The system is also licensed for all U.S. musical composition performance royalties through its licenses with ASCAP, BMI and SESAC. The system also ensures that any broadcast using the client software adheres to the sound recording performance complement as specified in the DMCA. Similar licensing arrangements are made to enable sharing of images and/or videos/movies.

The system is capable of indexing and summarizing images, music clips and/or videos. The system also identifies music clips or videos in a multimedia data stream and prepares a summary of each music video that includes relevant image, music or video information. The user can search the music using the verbal search system discussed above. Also, for game playing, the system can play the music or the microchunks of video in accordance with a search engine or a game engine instruction to provide better gaming enjoyment.

The methods described may be implemented in hardware, firmware, software, or combinations thereof, or in a computer program product tangibly embodied in a computer readable storage device. Storage devices suitable for tangibly embodying the computer program include all forms of volatile and non-volatile memory, including semiconductor memory devices, magnetic disks, magneto-optical disks, and optical disks.

What is claimed is:

1. A method to edit video directly on a stand-alone portable device, comprising:
   receiving a source video captured by the portable device;
   generating on the portable device a plurality of non-linear video editing instructions or tasks including one or more transitions, one or more effects, and one or more audio edits to be applied to the source video;
   assigning the tasks to a plurality of low power processor cores in the portable device to process the video editing instructions in parallel on the processing cores and reducing power to the cores when not editing video;
   receiving the outputs from the cores and rendering a video clip as an output on the portable device; and
   uploading the video clip to a server;
   wherein the portable device is a camcorder or a telephone.

2. The method of claim 1, wherein each processor comprises a 64-bit processor having a compatible 32-bit mode to execute pre-existing 32-bit Windows software, comprising a graphics system coupled to the processor cores.

3. The method of claim 1, comprising providing a point-to-point direct link between the processor and an Input/Output device.

4. The method of claim 1, comprising distributing tasks among the plurality of processors cores to accelerate the preview and rendering of motion, opacity, color, and image distortion effects.

5. The method of claim 1, comprising scaling the video clip to one of: DV, Digital Betacam, HDV, HDCAM, DVCPRO HD, and D5 HD.

6. The method of claim 1, comprising capturing and editing HDV or HDTV content.

7. The method of claim 1, comprising playing micro-chunks of video in real-time.

8. The method of claim 1, comprising playing multiple video channels at full resolution and with titles, transitions, effects, and color correction.

9. The method of claim 1, comprising viewing multiple video tracks from a multicam shoot, and switching between tracks in real time.

10. The method of claim 1, comprising performing color correction.

11. The method of claim 1, comprising applying primary and secondary color-correction tools to match shots; change colors; correct exposure errors; and modify highlights, midtones, and shadows across a clip, a sequence, or a project.

12. The method of claim 1, comprising editing comprises switching multiple nestable timelines.

13. The method of claim 1, comprising creating and manipulating multichannel audio to produce surround sound.

14. The method of claim 1, comprising generating interactive DVDs for digital dailies, test discs, or final delivery.

15. The method of claim 1, comprising:
   rendering transitions and effects using a first general purpose processor core;
   rendering audio using a second general purpose processor core;
   processing H.264 compressed video using a plurality of cores in a GPU; and
   rendering the video clip output and minimizing power consumption by the cores when H.264 video is not processed.

* * * * *